(No Model.)
J. H. PENDLETON.
MACHINE FOR SCOURING, CLEANING, AND POLISHING COFFEE, &c.
No. 274,369. Patented Mar. 20, 1883.
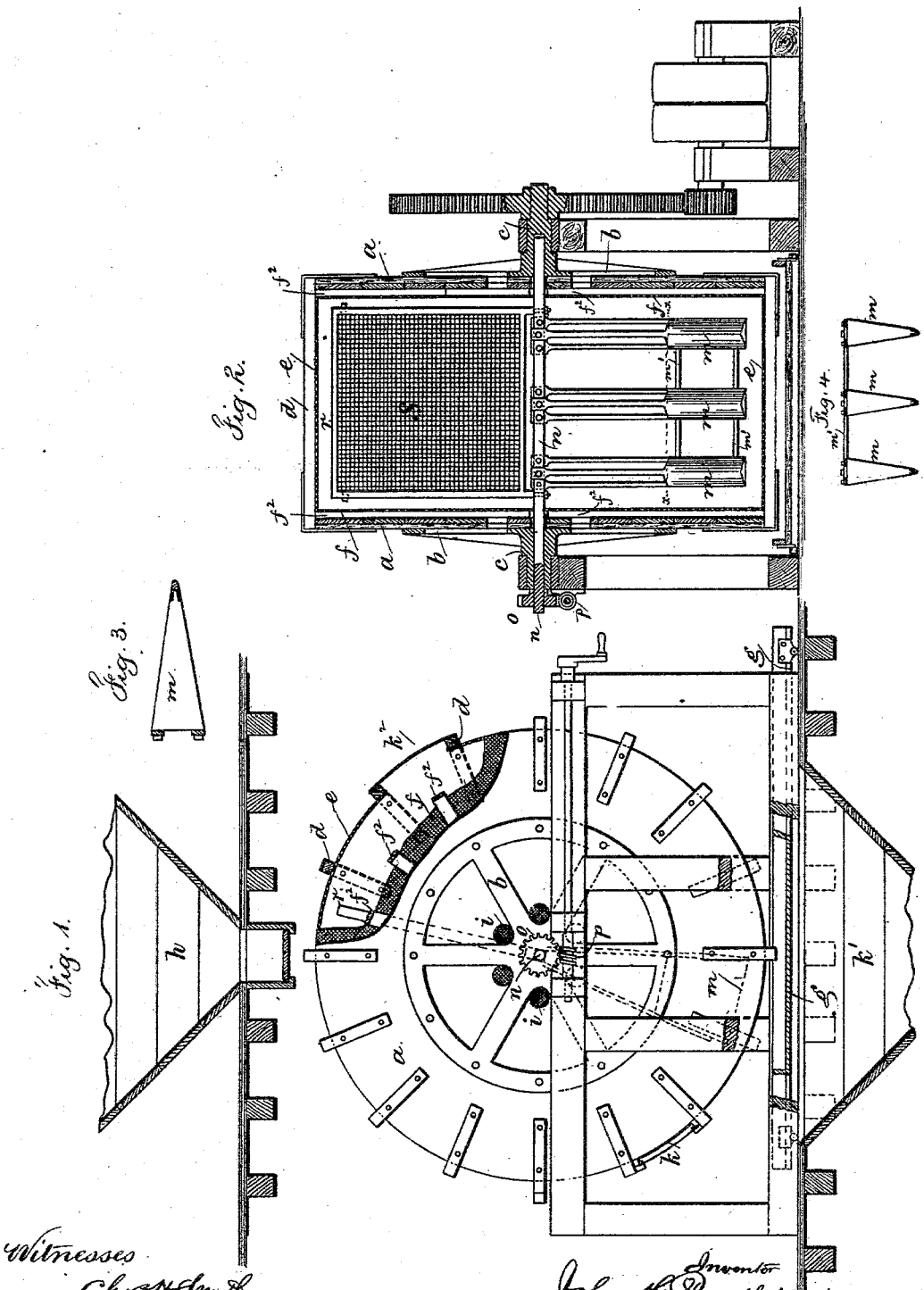

UNITED STATES PATENT OFFICE.

JOHN H. PENDLETON, OF BROOKLYN, NEW YORK, ASSIGNOR TO GEORGE H. RIPLEY.

MACHINE FOR SCOURING, CLEANING, AND POLISHING COFFEE, &c.

SPECIFICATION forming part of Letters Patent No. 274,369, dated March 20, 1883.

Application filed May 8, 1882. (No model.)

*To all whom it may concern:*

Be it known that I, JOHN H. PENDLETON, of Brooklyn, in the State of New York, have invented an Improvement in Machines for Scouring, Cleaning, and Polishing Coffee and Similar Material, of which the following is a specification.

In the drawings, Figure 1 is a side view of the machine, with the cylinder partially in section. Fig. 2 is a vertical cross-section. Fig. 3 is a plan of one of the wedge-shaped detainers; and Fig. 4 is a sectional plan at the line $x\,x$, Fig. 2.

The hollow revolving cylinder is adapted to receive the coffee to be scoured or polished. This cylinder is made of the two heads $a\,a$, preferably of boards nailed together and provided with central heads, $b$, bolted in place and having hollow journals $c$. The heads are connected by the cross-pieces $d$ and angle-irons, and the inner surfaces of the cross-pieces receive the cylinder $e$, of wire-cloth, that is nailed to said cross-pieces.

On the inner and opposite faces of the heads $a$ there are radial strips of wood $f^2$ nailed, and on these there are disks of wire-cloth $f$, so that the entire cylinder that receives the coffee is of wire-cloth, and the dust and particles of skin rubbed off the coffee by the revolution of the cylinder are free to escape through the wire-cloth and fall away upon the tray $g$, that is between the frames of the machine, and is adapted to be rolled back and forth on the floor.

The coffee is supplied into a hopper, $h$, above the cleaner, and the charge is introduced into the cleaner by revolving the same until a door or trap, $k$, in one side comes beneath the hopper, and this door and the slide of the hopper are opened and the coffee runs down into the cleaner. The door $k$ being closed and the cleaner revolved by suitable power, the berries rub against each other, and the skins will be detached and pass through the wire-cloth in small pieces. When the operation is complete, the tray $g$ is rolled away from beneath the cylinder, taking off all the dust and refuse. The door $k$ is then opened and the contents of the cylinder are emptied into the hopper $k'$.

There are openings $i$ through the heads $a$, near the center, so that a current of air can be drawn in by the centrifugal action of the cleaner while it is revolving, and this causes a circulation of air in the air-passages between the heads and the wire disks, and prevents the dust and particles accumulating and clogging said passages, and also allows of a circulation of air through the revolving scourer or cleaner.

In order to increase the rubbing action upon the coffee-beans, I employ wedge-shaped detainers $m$, that are held by rods passing to a central shaft, $n$, within the hollow journals. Braces $m'$ keep the detainers in line with each other. At the end of this shaft there is a wheel, $o$, and worm-pinion $p$, by which the shaft is held firmly, but which allows the wedge-shaped detainers to be moved into any desired position relatively to the bulk of the coffee within the cylinder. If the wedge-shaped detainers are at the lowest portion of the coffee as it lies in the revolving cylinder, they will produce a more severe rubbing action on the coffee-beans as they are forced, by the revolution of the cylinder, to pass through between them than they will if turned so as to be near the surface of the mass of coffee. Hence the action can be regulated for scouring, cleaning, or polishing the beans to a greater or less extent, as desired.

I make use, also, of an open frame-work, $r$, also on the shaft $n$, but at the opposite side of the shaft from the wedge-shaped detainers, and in this frame are hung flaps $s$, of canvas, wire-cloth, or similar material. These may be connected near their upper corners, so as to yield and allow the coffee to pass by, but at the same time to detain the beans sufficiently to rub or polish their surfaces; and when the wedge-shaped detainers are moved around by turning the shaft $n$ so as to be above the mass of coffee, the said flaps will be brought into the mass of moving coffee and act to rub and polish the same in a more gentle manner than the wedge-shaped detainers.

The wire-cloth at $k^2$, opposite to the inlet-door $k$, may be set at the outer side of the cross-bars $d$, so as to aid in balancing the revolving cylinder.

I am aware that revolving cleaning-cylinders have been used, and that hoppers are common for the reception of the material that is discharged from such cylinders. In my coffee-cleaner the cylinder is usually of a large size, and the lower side comes near to the floor. Hence it is important to be able to clear away the refuse matter with rapidity below the cylinder, in order that the coffee may be discharged into the hopper formed between the floor-beams; hence I use the removable tray that is drawn out from below the cylinder to take off the refuse and simultaneously uncover the hopper.

I claim as my invention—

1. In a cleaning-cylinder, the combination of heads $a$, strips $f^2$ upon the insides of the heads, disks $f$, of wire-cloth, fastened upon the strips, cross-pieces $d$, and cylinder $e$, of wire-cloth, substantially as specified.

2. The combination, in a coffee-cleaner, of a revolving cylinder of wire-cloth, a tray beneath such cylinder to receive the refuse material passing through the wire-cloth, rollers for supporting such tray on the floor and for allowing of its removal, and a hopper in the floor for the reception of the coffee, substantially as specified.

3. The combination, with the revolving cleaning-cylinder, of the wedge-shaped detainers $m$, the supporting-rods, the central shaft, $n$, with which such rods are connected, and means for holding and partially turning the shaft to adjust the detainers, substantially as specified.

Signed by me this 3d day of May, A. D. 1882.

J. H. PENDLETON.

Witnesses:
 GEO. T. PINCKNEY,
 CHAS. H. SMITH.